US012697939B2

(12) United States Patent
Didier

(10) Patent No.: US 12,697,939 B2
(45) Date of Patent: Aug. 4, 2026

(54) USE OF BIOMETRIC DATA TO FACILITATE PERSONALIZATION SERVICES SUCH AS VEHICLE IMMOBILIZATION IN AUTOMOBILES

(71) Applicant: Panasonic Automotive Systems America, LLC., Peachtree City, GA (US)

(72) Inventor: Derek Louis Didier, Newnan, GA (US)

(73) Assignee: Panasonic Automotive Systems America, Peachtree City, GA (US)

( * ) Notice: Subject to any disclaimer, the term of this patent is extended or adjusted under 35 U.S.C. 154(b) by 47 days.

(21) Appl. No.: 18/393,743

(22) Filed: Dec. 22, 2023

(65) Prior Publication Data

US 2024/0208464 A1 Jun. 27, 2024

Related U.S. Application Data

(60) Provisional application No. 63/435,154, filed on Dec. 23, 2022.

(51) Int. Cl.
| | |
|---|---|
| *B60R 25/25* | (2013.01) |
| *B60R 25/01* | (2013.01) |
| *B60R 25/30* | (2013.01) |
| *G06T 17/20* | (2006.01) |
| *G06V 10/82* | (2022.01) |
| *G06V 40/18* | (2022.01) |
| *H04N 23/23* | (2023.01) |

(52) U.S. Cl.
CPC ............ *B60R 25/255* (2013.01); *B60R 25/01* (2013.01); *B60R 25/305* (2013.01); *G06T*

*17/20* (2013.01); *G06V 10/82* (2022.01); *G06V 40/197* (2022.01); *H04N 23/23* (2023.01)

(58) Field of Classification Search
CPC ..... B60R 25/255; B60R 25/01; B60R 25/305; G06V 40/197; G06V 10/82; H04N 23/23; G06T 17/20
See application file for complete search history.

(56) References Cited

U.S. PATENT DOCUMENTS

| | | | |
|---|---|---|---|
| 6,400,835 B1 * | 6/2002 | Lemelson ............ | G06V 40/161 382/118 |
| 2012/0133616 A1 * | 5/2012 | Nishihara ........... | G06F 3/03542 345/175 |
| 2013/0250108 A1 * | 9/2013 | Du ........................ | G06F 18/251 348/148 |
| 2016/0224852 A1 * | 8/2016 | Vicente .................... | B60Q 9/00 |

(Continued)

*Primary Examiner* — Thomas D Alunkal
(74) *Attorney, Agent, or Firm* — Laurence S. Roach, Esq.

(57) ABSTRACT

A personalization arrangement for a motor vehicle includes an infrared camera capturing data that is unique to a human user disposed within the motor vehicle. Infrastructure implements a command from the human user. A database stores sets of data. Each set of data corresponds to a respective human user. An electronic processor determines whether the data captured by the infrared camera matches a set of data in the database corresponding to a respective human user. The electronic processor enables the infrastructure to implement the command from the human user, or inhibits the infrastructure from implementing the command, depending upon whether the data captured by the infrared camera matches a set of data in the database corresponding to a respective human user.

14 Claims, 2 Drawing Sheets

(56)          References Cited

U.S. PATENT DOCUMENTS

| | | | |
|---|---|---|---|
| 2016/0358028 A1* | 12/2016 | Sugie | G06V 40/19 |
| 2017/0048239 A1* | 2/2017 | Jeon | H04W 12/065 |
| 2017/0183035 A1* | 6/2017 | Patana | B60W 30/12 |
| 2018/0056989 A1* | 3/2018 | Donald | G06F 3/017 |
| 2019/0100219 A1* | 4/2019 | Jo | B60K 28/066 |
| 2019/0329791 A1* | 10/2019 | Oba | B60W 50/12 |
| 2020/0086881 A1* | 3/2020 | Abendroth | G10L 17/00 |

* cited by examiner

Vehicle Infrastructure (CAN, Ethernet, SERDES, etc.)

16

Processor

14

Machine Learning or CNN Algorithm

18

Database of Registered Users

20

IR Camera

12

24

22

10

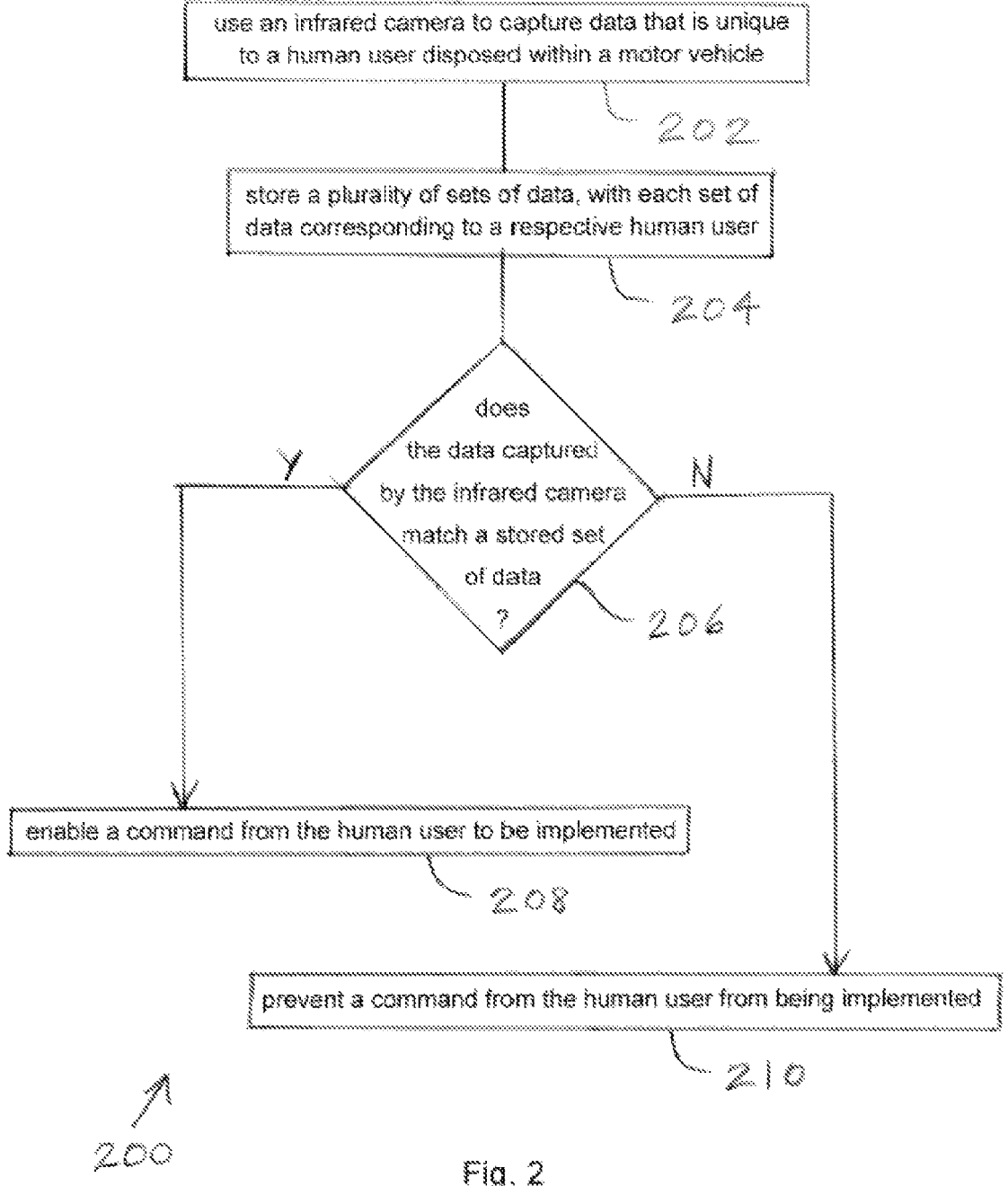

use an infrared camera to capture data that is unique
to a human user disposed within a motor vehicle

202 store a plurality of sets of data, with each set of
data corresponding to a respective human user

204 does
the data captured
by the infrared camera
match a stored set
of data
?

206

Y

N enable a command from the human user to be implemented

208 prevent a command from the human user from being implemented

USE OF BIOMETRIC DATA TO FACILITATE PERSONALIZATION SERVICES SUCH AS VEHICLE IMMOBILIZATION IN AUTOMOBILES

CROSS-REFERENCED TO RELATED APPLICATIONS

This application claims benefit of U.S. Provisional Application No. 63/435,154, filed on Dec. 23, 2022, the disclosure of which is hereby incorporated by reference in its entirety for all purposes.

BACKGROUND OF THE INVENTION

1. Field of the Invention

The present invention relates to personalization of a motor vehicle by use of biometric data.

2. Description of the Related Art

The prevalence of carjacking, vehicle theft and tracking of stolen automobiles is a huge problem and headache for drivers. Biometric data such as face recognition and iris scan are already widely used for security at airports and for unlocking mobile phones and other devices. Iris scans in particular appear to be similar to fingerprints in that each set of irises are unique to the individual. Systems like "CLEAR" have already been deployed in airports. It is not clear if such technology is yet in use in automobiles to serve as a security/personalization feature.

Personalization is not typically used or is not widespread in the control of access to an automobile. Key fobs, manual keys and manual pass codes are used to control access to the vehicle, but these methods do not protect the automobile from theft or unauthorized use.

SUMMARY OF THE INVENTION

The invention may reduce and/or eliminate car theft, carjacking or stolen vehicles using a person's biometric data in addition to key fob for security. The invention may provide a way to use biometric data to augment personalization features available to drivers of automobiles. In particular, the invention may use biometric data obtained using facial recognition and/or iris scanning together with the key fob to deter/prevent theft and/or unauthorized use of an automobile. The invention may personalize the access and control of the automobile by using an additional modality that is unique to the user, namely, a person's face and the iris of the eye.

The invention may use a camera with an infrared (IR) light source that illuminates the irises. Alternatively, the invention may use an IR flood to deploy a 3D mesh of points on the face for face detection. The camera can be placed directly behind the rearview mirror, on the A-pillar, in the headliner, or in some other suitable location with a clear view of the driver's face. The camera may take the image of the irises or construct a 3D image of the face using depth of field technology (TOF). The camera may use a processor to process the points of the image using machine learning or convolutional neural networks against a stored set of images (e.g., an approved database). If a match is obtained and the driver is in possession of the key fob (that is, the key fob is sensed) then the vehicle can be started and driven off. The system can be programmed to check the iris at preprogrammed intervals, only when the car door is unlocked and opened from the driver's side, at start/stop, etc., for a seamless driver experience. The processor can communicate with the vehicle infrastructure through a controller area network (CAN), a local interconnect network (LIN), serializer/deserializer (SERDES), Ethernet or other standard to permit the car to be driven off.

The invention comprises, in one form thereof, a personalization arrangement for a motor vehicle, including an infrared camera capturing data that is unique to a human user disposed within the motor vehicle. Infrastructure implements a command from the human user. A database stores sets of data. Each set of data corresponds to a respective human user. An electronic processor is communicatively coupled to each of the infrared camera, the infrastructure, and the database. The electronic processor determines whether the data captured by the infrared camera matches a set of data in the database corresponding to a respective human user. The electronic processor enables the infrastructure to implement the command from the human user in response to determining that the data captured by the infrared camera matches a set of data in the database corresponding to a respective human user. The electronic processor inhibits the infrastructure from implementing the command from the human user in response to determining that the data captured by the infrared camera does not match any of the sets of data in the database each corresponding to a respective human user.

The invention comprises, in another form thereof, a personalization method for a motor vehicle, including using an infrared camera to capture data that is unique to a human user who is disposed within the motor vehicle. A plurality of sets of data are stored. Each of the sets of data corresponds to a respective human user. It is determined whether the data captured by the infrared camera matches one of the stored sets of data. In response to the determining step including determining that the data captured by the infrared camera matches one of the stored sets of data, a command from the human user is enabled or allowed to be implemented. However, in response to the determining step including determining that the data captured by the infrared camera does not match any of the stored sets of data, a command from the human user is prevented from being implemented.

The invention comprises, in yet another form thereof, a personalization arrangement for a motor vehicle, including an infrared camera capturing image data from a human user disposed within the motor vehicle. A database stores a plurality of sets of image data. Each set of image data corresponds to a respective human user. An electronic processor is communicatively coupled to both the infrared camera and the database. The electronic processor determines whether the image data captured by the infrared camera matches a set of image data in the database corresponding to a respective human user. The electronic processor causes a command from the human user to be implemented in response to determining that the image data captured by the infrared camera matches a set of image data in the database corresponding to a respective human user. The electronic processor causes a command from the human user to be ignored in response to determining that the image data captured by the infrared camera does not match any of the sets of image data in the database that correspond to a respective human user.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 2 is a flow chart of one embodiment of an automotive personalization method of the present invention.

DETAILED DESCRIPTION

Figure 1:
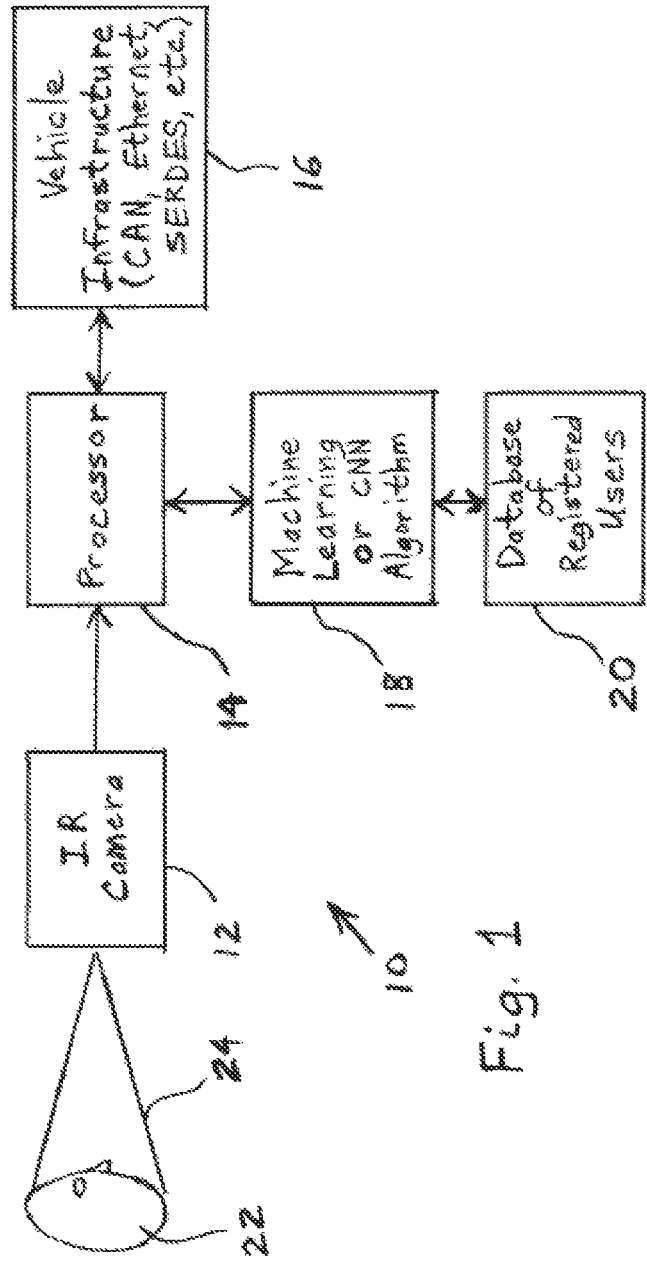
FIG. 1 is a block diagram of one embodiment of an automotive personalization arrangement of the present invention.

The embodiments hereinafter disclosed are not intended to be exhaustive or limit the invention to the precise forms disclosed in the following description. Rather the embodiments are chosen and described so that others skilled in the art may utilize its teachings.

FIG. 1 illustrates one embodiment of an automotive personalization arrangement 10 of the present invention, including an infrared camera 12, an electronic processor 14, vehicle infrastructure 16, a machine learning or convolutional neural networks algorithm 18, and a database of registered users 20. The entirety of arrangement 10 may be disposed within the same motor vehicle. However, it is also possible for processor 14, algorithm 18 and/or database 20 to be located outside the vehicle and wirelessly communicate with other elements of arrangement 10.

During use, camera 12 may illuminate the irises of the eyes of a human user 22 with IR light. Alternatively, camera 12 may provide a flood of IR light to obtain a 3D mesh of points on the face of user 22 for face recognition. Camera 12 may emit the IR light with a conical field of view 24. The data captured by camera 12 may be forwarded to processor 14, which employs a machine learning or convolutional neural networks (CNN) algorithm 18 to determine whether the data matches a set of data in database 20 that corresponds to a particular registered user. That is, processor 14 applies algorithm 18 to the data from camera 12 to determine whether user 22 is a registered user. If it is determined that user 22 is indeed a registered user, then processor 14 controls infrastructure 16 such that infrastructure 16 is responsive to the commands from user 22. For example, if user 22 presses a START pushbutton (not shown) in the motor vehicle, then infrastructure 16 may start the vehicle if user 22 has been determined to be a registered user, and may not start the vehicle if user 22 has been determined to not be a registered user. Other commands from user 22 may include pressing a pushbutton on a key fob, pressing a pushbutton within the vehicle, providing a voice command, providing a gesture command, or pressing a lever within the motor vehicle. The command may be to lock/unlock a door, move a seat position, use a communication system, use an infotainment system, open/close a hatchback or truck lid, etc.

FIG. 2 is a flow chart of one embodiment of an automotive personalization method 200 of the present invention. In a first step 202, an infrared camera is used to capture data that is unique to a human user disposed within a motor vehicle. For example, infrared camera 12 may provide a flood of IR light to obtain a 3D mesh of points on the face of user 22 for face recognition.

Next, in step 204, a plurality of sets of data are stored. Each set of data corresponds to a respective human user. For example, the data captured by camera 12 for a plurality of users may be forwarded to processor 14, which may store each set of data in database 20 in association with a respective registered user.

In a next step 206, it is determined whether the data captured by the infrared camera matches a stored set of data. For example, the user data recently (e.g., in the immediately preceding sixty seconds) captured by infrared camera 12 may be compared to sets of data stored in database 20. If the data captured by the infrared camera matches a stored set of data, then in step 208 a command from the human user is implemented. For example, if the recently captured data matches one particular set of data stored in database 20, then a command from the user (e.g., a command to turn ON the vehicle ignition) may be followed and put into action. On the other hand, if the data captured by the infrared camera does not match a stored set of data, then in step 210 the command from the human user is not implemented. For example, if the recently captured data does not match any set of data stored in database 20, then a command from the user (e.g., a command to turn ON the vehicle ignition) may be ignored and not put into action.

Although the invention has been described herein as being implemented through face recognition or iris scanning, gesture recognition via a series of swipes or biometric data such as from fingerprint scanning could alternatively be used for personalization of the automotive experience and could be used to immobilize the vehicle in the same way as iris detection/facial recognition. Gesture recognition may require the user to execute a series of memorized hand "swipes" in order to be permitted to control the vehicle. Fingerprint scanners would require the hand to be ungloved.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A personalization arrangement for a motor vehicle, the arrangement comprising:

an infrared camera configured to capture images of hand gestures of human users while the human users are disposed within the motor vehicle;

infrastructure configured to implement a command from the human user;

a database storing a plurality of sets of image data, each said set of image data corresponding to a respective set of hand gestures that are unique to a respective one of the human users; and an electronic processor communicatively coupled to each of the infrared camera, the infrastructure, and the database, the electronic processor being configured to:

determine whether the images of hand gestures captured by the infrared camera match a set of image data in the database corresponding to a respective set of hand gestures that are unique to a respective one of the human users;

enable the infrastructure to implement the command from the human user in response to determining that the images of hand gestures captured by the infrared camera match a set of image data in the database corresponding to a respective set of hand gestures that are unique to a respective one of the human users; and inhibit the infrastructure from implementing the command from the human user in response to determining that the images of hand gestures captured by the infrared camera do not match any of the sets of image data in the database each corresponding to a respective set of hand gestures that are unique to a respective one of the human users.

2. The arrangement of claim 1 wherein the command is a command to start operation of a motor of the motor vehicle.

3. The arrangement of claim 1 wherein the command is a command to unlock a door of the motor vehicle.

4. The arrangement of claim 1 wherein the electronic processor is configured to use a machine learning algorithm to determine whether the images of hand gestures captured by the infrared camera matches a set of image data in the database corresponding to a respective set of hand gestures that are unique to a respective one of the human users.

5. The arrangement of claim 1 wherein the electronic processor is configured to use a convolutional neural networks algorithm to determine whether the images of hand gestures captured by the infrared camera matches a set of image data in the database corresponding to a respective set of the hand gestures that are unique to a respective one of the human users.

6. A personalization method for a motor vehicle, the method comprising:

using an infrared camera to capture images of hand gestures of human users while the human users are disposed within the motor vehicle;

storing a plurality of sets of image data, each said set of image data corresponding to a respective set of hand gestures that are unique to a respective one of the human users;

determining whether the images of hand gestures captured by the infrared camera match stored said set of image data corresponding to a respective set of hand gestures that are unique to a respective one of the human users;

enabling a command from the human user to be implemented, the enabling being in response to the determining step including determining that the images of hand gestures captured by the infrared camera match one of the stored sets of data corresponding to a respective set of hand gestures that are unique to a respective one of the human users; and preventing a command from the human user from being implemented, the preventing being in response to the determining step including determining that the images of hand gestures captured by the infrared camera do not match any of the stored sets of image data in the database each corresponding to a respective set of the hand gestures that are unique to a respective one of the human users.

7. The method of claim 6 wherein the command is a command to start operation of a motor of the motor vehicle.

8. The method of claim 6 wherein the command is a command to unlock a door of the motor vehicle.

9. The method of claim 6 wherein a machine learning algorithm is used to determine whether the images of hand gestures captured by the infrared camera matches a respective set of hand gestures that are unique to a respective one of the human users.

10. The method of claim 6 wherein a convolutional neural networks algorithm is used to determine whether the images of hand gestures captured by the infrared camera matches a respective set of hand gestures that are unique to a respective one of the human users.

11. A personalization arrangement for a motor vehicle, the arrangement comprising:

an infrared camera configured to capture image data from hand gestures of human users while the human users are disposed within the motor vehicle;

a database storing a plurality of sets of image data, each said set of image data corresponding to a respective set of hand gestures that are unique to a respective one of the human users; and an electronic processor communicatively coupled to both the infrared camera and the database, the electronic processor being configured to:

determine whether the images of hand gestures captured by the infrared camera matches a set of image data in the database corresponding to a respective set of hand gestures that are unique to a respective one of the human users;

cause a command from the human user to be implemented in response to determining that the image data captured by the infrared camera matches a set of image data in the database corresponding to a respective set of hand gestures that are unique to a respective one of the human users; and cause a command from the human user to be ignored in response to determining that the image data captured by the infrared camera does not match any of the sets of image data in the database that correspond to a respective set of hand gestures that are unique to a respective one of the human users.

12. The arrangement of claim 11 wherein the command is a command to start operation of a motor of the motor vehicle.

13. The arrangement of claim 11 wherein the electronic processor is configured to use a machine learning algorithm to determine whether the data captured by the infrared camera matches a respective set of hand gestures that are unique to a respective one of the human users.

14. The arrangement of claim 11 wherein the electronic processor is configured to use a convolutional neural networks algorithm to determine whether the data captured by the infrared camera matches a respective set of hand gestures that are unique to a respective one of the human users.

* * * * *